UNITED STATES PATENT OFFICE.

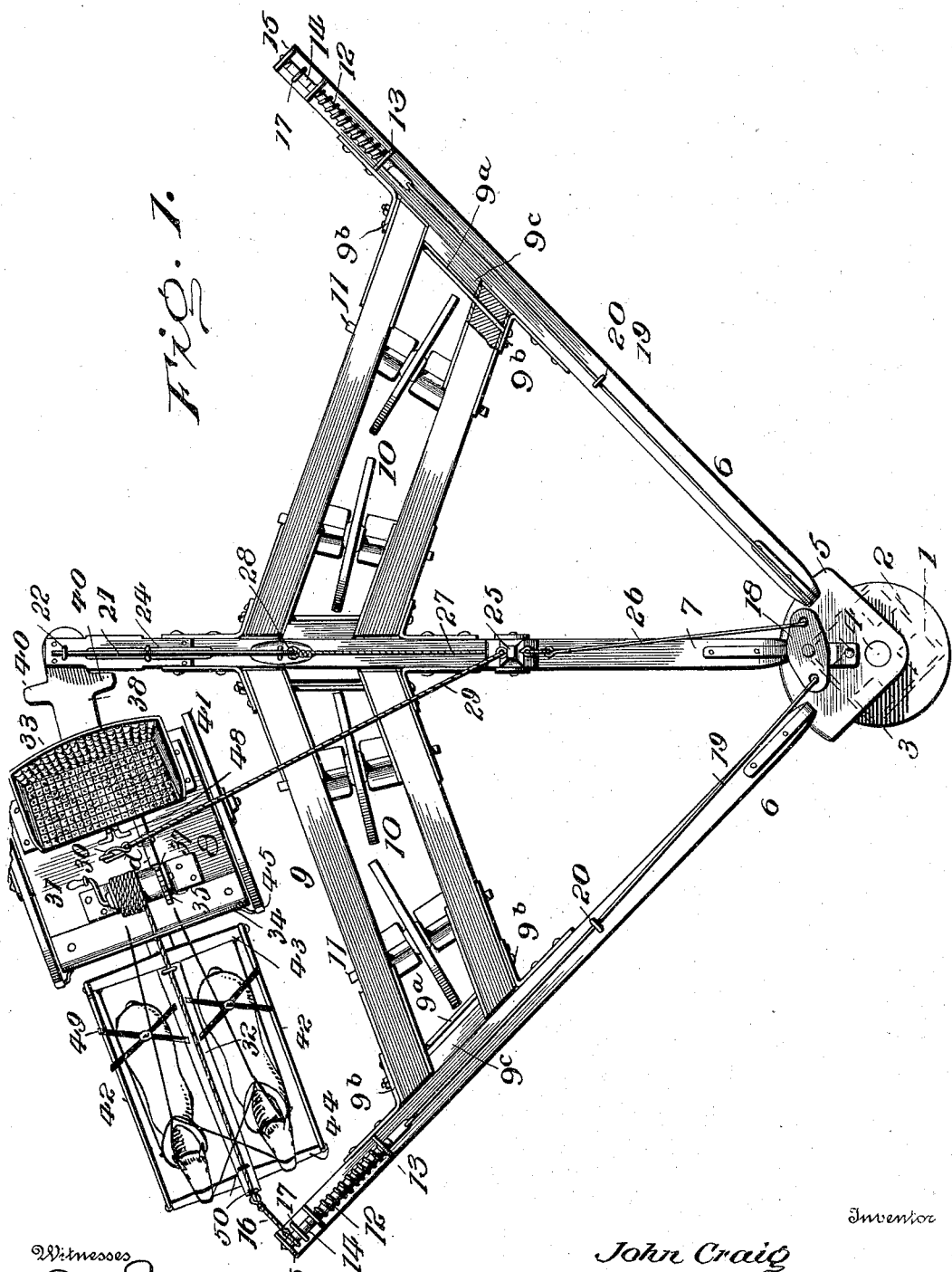

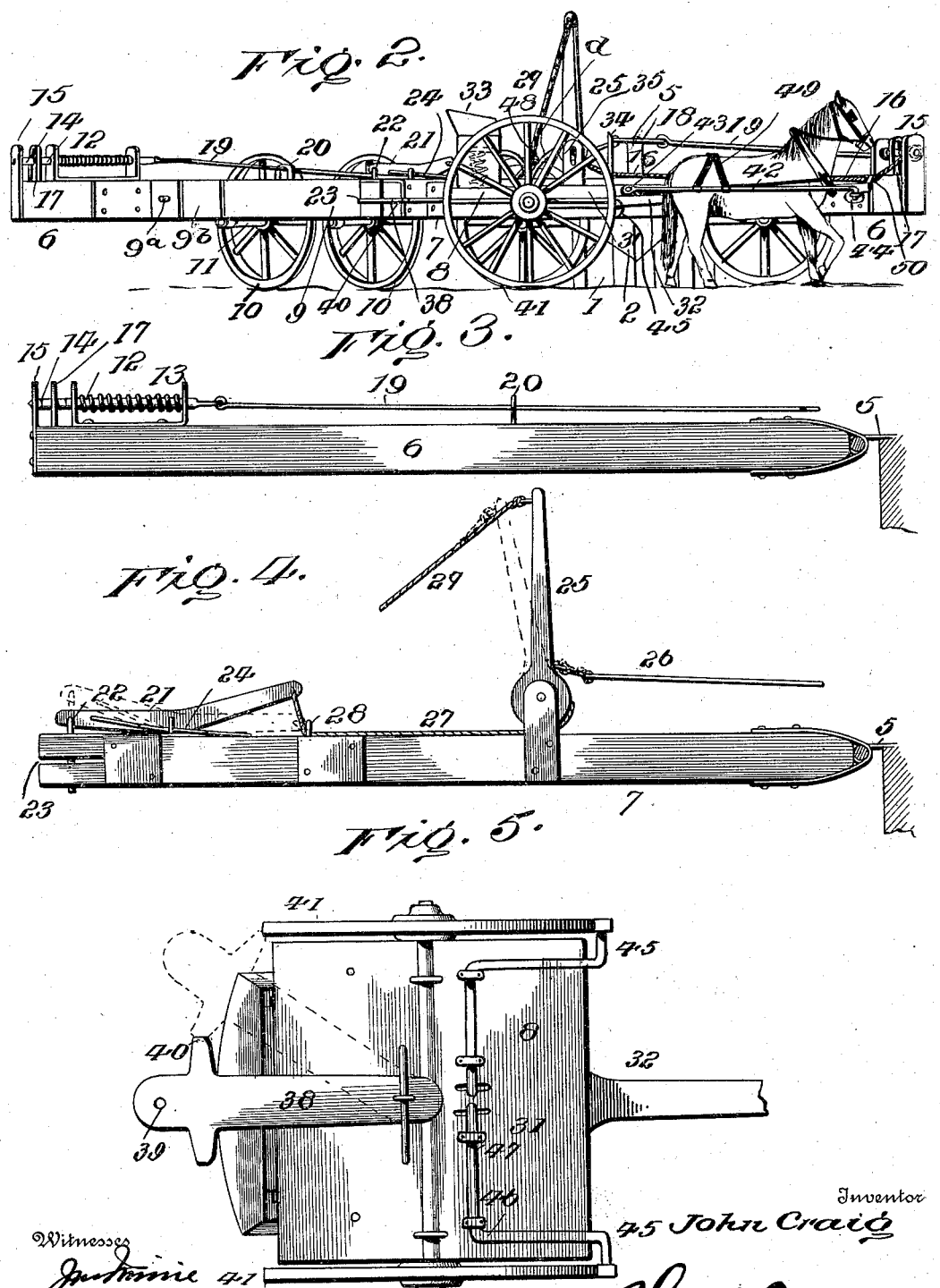

JOHN CRAIG, OF SCHUYLER, NEBRASKA.

HORSE-BREAKING APPARATUS.

SPECIFICATION forming part of Letters Patent No. 639,215, dated December 19, 1899.

Application filed April 13, 1899. Serial No. 712,889. (No model.)

*To all whom it may concern:*

Be it known that I, JOHN CRAIG, a citizen of the United States, residing at Schuyler, in the county of Colfax and State of Nebraska, have invented certain new and useful Improvements in Horse-Breaking Apparatus; and I do hereby declare the following to be a full, clear, and exact description of the invention, such as will enable others skilled in the art to which it appertains to make and use the same.

This invention has for its object to devise means for training colts, young horses, and animals which are required for draft and driving purposes. It may likewise be used to advantage in bringing fractious and unruly animals into subjection and breaking them of such vicious traits as rearing, pitching, kicking, shying, and the like.

One of the chief aims of the invention is safety to the driver and animal, and the provision of an apparatus of simple construction, easy of manipulation, and effective in operation.

The apparatus is constructed with a view to training the animal single or double and in both directions, whereby when broken in the animal may be driven in any direction.

While the drawings illustrate an embodiment of the invention, it is to be understood that in special construction various changes in the form, proportion, and minor details may be resorted to without departing from the spirit of the invention or sacrificing any of the advantages thereof, and in order that the details may be fully comprehended reference is to be had to the following description and the drawings hereto attached, in which—

Figure 1 is a top plan view of the apparatus. Fig. 2 is a side elevation. Fig. 3 is a front view of a lead sweep. Fig. 4 is a detail view in elevation of the intermediate sweep, the dotted lines showing the manner of operating the lever for releasing the team. Fig. 5 is a detail view of the cart inverted, the dotted lines showing the position of the reach when brought into contact with a wheel of the cart.

Corresponding and like parts are referred to in the following description and indicated in all the views of the drawings by the same reference characters.

The apparatus comprises a center post 1, about which the sweeps and adjunctive parts rotate. This center post is composed of a number of elements, four being shown, which are let into the ground and which are connected at their upper ends by a cap 2, to which is attached a circular head 3, from which rises an axis 4. A plate 5 is mounted upon the axis 4 and circular head 3, so as to turn freely thereon, and in outline approximates the form of a quadrant. The sweeps 6 and 7 are hinged or loosely connected at their inner ends with the plate 5, so as to have independent play at their outer ends. The sweeps are three in number, the outer sweeps 6 being leads and the middle or intermediate sweep 7 supporting the releasing mechanism and coöperating with either of the lead sweeps to fix the position of the cart 8.

Parallel bars 9 connect the lead sweeps with the intermediate sweep intermediate of their ends and have pivotal or hinged connection at their extremities with the respective sweeps, so as to admit of the latter having independent vertical movement to adapt themselves to unevenness in the surface of the ground upon which the apparatus is placed, whereby the series of ground-wheels 10 may at all times travel upon the surface of the ground when the apparatus is in operation. The pivot-fastenings $9^a$ for the bars 9 consist of bolts or headed rods $9^a$, passing through openings in the said bars, and parallel wings of angle-irons or brackets $9^b$, secured to the sweeps. Spacing-blocks $9^c$ are secured to the sweeps and come between the bars 9 and prevent relative inward movement thereof, the bars 9 being confined between the terminals of the spacing-blocks and the adjacent wings of the brackets $9^b$. The ground-wheels 10 are mounted upon axles 11, applied to the end portions of the parallel bars 9. The axles 11 have a radial disposition with reference to the center of rotation of the device about the vertical axis 4. Hence the wheels 10 can turn freely upon them without binding. The lead sweeps are similarly equipped, each being provided at its outer end with a spring-actuated bolt 12, slidably mounted in brackets 13 and having their outer ends reduced and provided with a roller 14. Plates 15 are secured to the extremities of the lead sweeps and project vertically therefrom and have their upper ends apertured to receive the outer terminals of the bolts 12, so as to prevent the accidental disengagement of the rope 16 therefrom when the apparatus is in active operation. A guard 17 is applied to the outer end of each lead sweep and is arranged a short distance from the plate 15 and prevents inward movement of the front or attaching end of the rope 16 when withdrawing the bolt 12 to effect a release of said rope. A lever 18 is fulcrumed intermediate of its ends upon a pin rising vertically from the plate 5, and a wire or like connection 19 connects one end of said lever with the spring-actuated bolt 12 and passes through a guide-eye 20, applied to the lead sweep.

A lever 21 is fulcrumed intermediate of its ends to the outer portion of the intermediate sweep 7, and its arms are slightly upwardly divergent from its fulcrum. A pin 22 is loosely connected with the outer arm of the lever 21 and operates in a vertically-disposed opening formed in the outer end portion of the sweep 7 and is adapted to extend across a horizontal slot 23, extending inward from the extremity of the said sweep 7. A spring 24 coöperates with the lever 21 and normally tends to hold the outer arm of the said lever depressed and its inner arm elevated, whereby the pin 22 is held projected across the horizontal slots 23 under normal conditions. A releasing-lever 25 is fulcrumed upon the sweep 7 at an intermediate point, and its pivotal end is made circular and is operatively connected with the levers 18 and 21 in such a manner that upon operating the lever 25 simultaneous movement will be imparted to the levers 18 and 21 and effect a release of the team from the apparatus. A wire 26 or like part connects the releasing-lever 25 with the lever 18, and a rope 27 or similar part connects the lever 25 with the lever 21 and passes through a guide-eye 28, applied to the sweep 7 and located at a point below the rear end of the lever 21. An operating rope or cord 29 is connected at one end with the outer extremity of the releasing-lever 25, and its opposite end is supplied with a hook 30 or like device, by means of which the outer end of the said rope or cord can be attached to a convenient portion of the cart 8, so as to be readily accessible to the driver to be pulled upon when it is required to liberate the team.

The cart, which may be of any substantial construction, is shown as consisting of a platform 31, from which projects a pole or tongue 32 and to which is applied a seat 33 and a footboard 34. A windlass 35 is mounted upon the front portion of the platform and the rear portion of the rope 16 is attached thereto and adapted to be wound thereon. A spring-actuated detent $d$ is mounted upon the platform within convenient reach of the foot of the driver and is adapted to coöperate with ratchet-teeth 37, applied to the windlass, so as to prevent the rope 16 unwinding or paying out from the windlass when wound thereon to the required point. A reach 38 is centrally disposed with reference to the platform 31 and is pivoted thereto at its forward end, its rear end projecting in the rear of the cart any required distance, so as to be detachably connected with the outer end of the sweep 7. An opening 39 is formed in the rear of the reach 38 and is adapted to receive the pin 22 when the reach is inserted into the slot 23 and retained in position. Lateral extensions 40 project from opposite edges of the reach 38 and are disposed so as to engage with the rims of the vehicle-wheels 41 and prevent a too-great lateral movement of the cart. These extensions 40 come forcibly into contact with the rims of the wheels 41 and act as a check and limit the lateral movement of the cart with reference to the reach.

Restraining-bars 42 are located at the sides of the pole or tongue 32 and have loose connection at their ends with the whiffletree 43 and neck-yoke 44. These bars 42 coöperate with the pole or tongue and prevent outward movement of the animal when hitched to the cart. One end of each of the restraining-bars has detachable connection with either the whiffletree or the neck-yoke, so as to admit of the animal being led into position. As shown, the outer ends of the restraining-bars are hooked and are removably connected with eyes at the terminals of the neck-yoke. The rear ends of the restraining-bars are formed into eyes which interlock with corresponding eyes at the extremities of the whiffletree, the construction being such as to admit of the bars being thrown entirely out of the way when hitching or unhitching the animal.

Independent brakes 45 are provided for each of the vehicle-wheels 41 and are under the control of the driver, whereby either brake can be set, so as to assist in the proper management of the animal and facilitate its guiding. These brakes may be of any ordinary construction, and, as illustrated, consist of rods 46, mounted in bearings applied to the platform and having their end portions bent downwardly, their outer ends being provided with brake-shoes in position to engage with the rims of the vehicle-wheels 41 and their inner arms being connected by rods 47 with foot-levers 48, fulcrumed to the platform 31 and extending within convenient reach of the driver's feet.

The animals are harnessed and hitched to the cart in any desired manner, and kicking-straps 49 extend over the hips and are attached at their ends to the pole or tongue 32 and the restraining-bars 42. The rope 16 after passing through an opening in the footboard 34 extends along the top side of the pole or tongue 32 and passes through guide-eyes 50, applied to the extremity and to the outer side of the said pole, and its forward end is formed into a loop which is adapted to be engaged by the outer end portion of the spring-actuated bolt 12. After the team has been hitched to the cart and the latter secured to a lead and the intermediate sweep by means of the rope 27 and the reach 38 in the manner set forth the team is started and is compelled to travel in a predetermined course by the restraining influence of the sweeps and the parts coöperating therewith. When the animals have become sufficiently broken to give them a little leeway, the rope 16 is slackened by unwinding it from the windlass 35 to the required extent. Should the trial prove unsatisfactory, the animals are drawn into position by rewinding the rope 16 upon the windlass, so as to take up the slack. On the other hand, should the test warrant a release of the team a pull upon the operating-rope 29 will disengage the rope 16 and the reach 38 and liberate the team from the restraining influence of the apparatus. The animal may be trained in either direction by hitching the rope 27 to the desired lead sweep, the animals facing the direction in which it is required to train them. The apparatus is of such construction that the animal may be trained single or double. When trained single, it is to be understood that the animal is hitched upon either the inside or the outside of the pole or tongue, as may be found most advantageous. When reversing the movement of the apparatus, the wire 26 is shifted from one end to the other of the lever 18, and the wire 19, previously attached to the said lever 18, is disconnected therefrom, and the wire applied to the lead sweep now brought into action is attached to the end of the lever 18, to which the wire 26 was previously attached.

Having thus described the invention, what is claimed as new is—

1. In a horse-breaking apparatus, an intermediate and lead sweeps loosely connected and adapted to have independent movement at their outer ends, and means applied to the said sweeps and adapted to secure the team thereto with the animal facing in either direction, substantially as set forth.

2. In a horse-breaking apparatus, an intermediate and lead sweeps mounted to rotate about a vertical axis, bars interposed between the sweeps and having loose connection therewith and adapted to maintain them a fixed distance apart and to permit of the sweeps having independent movement at their outer ends, and means applied to the several sweeps for securing the team thereto in either direction, substantially as described.

3. In a horse-breaking apparatus, an intermediate and lead sweeps mounted to rotate about a vertical axis, bars interposed between the several sweeps and having loose connection therewith to permit of their having independent movement at their outer ends, ground-wheels applied to the end portions of said bars, and means applied to the several sweeps for attachment thereto of the team in either direction, substantially as specified.

4. In a horse-breaking apparatus, an intermediate and lead sweeps connected to rotate about a vertical axis and provided with means for attachment thereto of the team in either direction, spaced bars interposed between the several sweeps and loosely connected at their ends thereto at an intermediate point, and ground-wheels located in the spaces formed between said bars and applied thereto at opposite ends, the parts being combined to admit of the sweeps having independent movement at their outer ends and the ground-wheels resting upon the supporting-surface under all conditions, substantially as set forth.

5. In a horse-breaking apparatus, the combination with a sweep, of a cart, a windlass applied to the cart and under control of the driver, a rope adapted to wind upon the windlass at one end, and means for detachably connecting the opposite end of the rope to the aforesaid sweep, substantially as and for the purpose specified.

6. In a horse-breaking apparatus, the combination with a sweep, a spring-actuated locking device applied to the said sweep, and means for withdrawing the locking device to effect a release of the part attached thereto, of a cart, a windlass applied to the cart and under the control of the driver, and a rope adapted to have an end portion wound upon the windlass and having its opposite end adapted to be detachably connected with the aforesaid locking device, substantially as described.

7. In a horse-breaking apparatus, the combination with companion sweeps, of locking devices applied to the sweeps for attachment thereto of the team, and means under the control of the driver for simultaneously operating both sets of locking devices, as and for the purpose set forth.

8. In a horse-breaking apparatus, the combination with companion sweeps, of locking devices applied to the said sweeps for attachment thereto of the team, a lever fulcrumed between its ends and having its terminal portions connected with the said locking devices, and means for turning said lever to effect a simultaneous movement of the said locking devices, substantially as set forth.

9. In a horse-breaking apparatus, the combination with companion sweeps, of spring-actuated locking devices applied thereto, a lever fulcrumed intermediate of its ends, a connection between a terminal portion of said lever and a locking device, a releasing-lever, and connections between said releasing-lever and the other locking device and the opposite terminal portion of the medially-fulcrumed lever, substantially as specified.

10. In a horse-breaking apparatus, the combination with a sweep and a cart, of a reach pivoted at its front end to the cart and having lateral extensions adapted to come into contact with the rims of the vehicle-wheels, substantially as set forth.

11. In a horse-breaking apparatus, the combination of a cart having a rearwardly-extending reach, a sweep having a slotted portion to receive the said reach, and locking means applied to the sweep and adapted to make detachable connection with the said reach, substantially as specified.

12. In a horse-breaking apparatus, the combination with a cart having a pole or tongue provided with a whiffletree and a neck-yoke, of restraining-bars connecting the terminal portions of the whiffletree and neck-yoke and adapted to be detachably connected at one end with either one or the other of the said parts and having their opposite ends loosely connected with the remaining part, substantially as set forth.

13. In a horse-breaking apparatus, an intermediate and lead sweeps, locking devices applied to the several sweeps and adapted to detachably connect the team therewith in either direction, and a releasing mechanism mounted upon the intermediate sweep and under the control of the driver and adapted to coöperate with the locking device to either of the lead sweeps according to the relative position of the team to effect a simultaneous operation of the locking device, substantially as described.

14. A horse-breaking apparatus comprising a central post provided with a vertical axis, a plate rotatably mounted upon the said axis, intermediate and lead sweeps hingedly connected with said plate and adapted to have independent vertical movement at their outer ends, interposed bars loosely connecting the sweeps at an intermediate point with ground-wheels at their opposite ends, locking devices applied to the several sweeps, a releasing mechanism mounted upon the intermediate sweep and adapted to coöperate with the locking device applied to either of the lead sweeps to effect a simultaneous movement of the locking devices of said lead and intermediate sweeps, a cart having a rearwardly-extending reach pivoted thereto and adapted to be detachably connected with the intermediate sweep, and a rope and windlass mounted upon the cart and adapted to make detachable connection with either of the lead sweeps, substantially as and for the purpose set forth.

In testimony whereof I affix my signature in presence of two witnesses.

JOHN CRAIG. [L. S.]

Witnesses:
GEORGE N. WELLS,
WILLIAM D. FLETCHER.